(12) United States Patent
Laukkanen et al.

(10) Patent No.: US 6,699,417 B2
(45) Date of Patent: Mar. 2, 2004

(54) COATING METHOD FOR A ROLL OR CYLINDER

(75) Inventors: Pekka Laukkanen, Tuusula (FI); Antti Veli Antero Vähämaa, Järvenpää (FI)

(73) Assignee: Stratum Oy, Kellokoski (FI)

( * ) Notice: Subject to any disclaimer, the term of this patent is extended or adjusted under 35 U.S.C. 154(b) by 0 days.

(21) Appl. No.: 10/177,644

(22) Filed: Jun. 21, 2002

(65) Prior Publication Data

US 2003/0170488 A1 Sep. 11, 2003

(30) Foreign Application Priority Data

Mar. 6, 2002 (FI) .............................................. 20020429

(51) Int. Cl.[7] .......................... B32B 31/30; B29C 41/00
(52) U.S. Cl. .............................. 264/172.19; 264/173.1; 264/319; 264/177.17; 29/895; 29/895.32
(58) Field of Search ..................... 264/172.19, 173.1, 264/293, 299, 319, 177.17; 29/895, 895.33, 895.32, DIG. 11, DIG. 47; 427/404; 72/274

(56) References Cited

U.S. PATENT DOCUMENTS 4,259,382 A * 3/1981 Schwan ........................ 428/36
5,261,991 A * 11/1993 Zackrisson et al. ......... 156/294

FOREIGN PATENT DOCUMENTS

DE     29 23 544 A1    12/1980
DE     84 06 019.0     5/1984
EP     0 461 253 A1    12/1991

\* cited by examiner

Primary Examiner—Michael LaVilla
(74) Attorney, Agent, or Firm—Brooks Kushman P.C.

(57) ABSTRACT

The invention relates to a method for coating a composite cylinder. On top of said composite cylinder (1) is drawn or extruded a metal casing (2), whose metal surface is modified a metal treatment process and/or plated with a coating layer.

10 Claims, 1 Drawing Sheet

COATING METHOD FOR A ROLL OR CYLINDER

The invention relates to the coating of elongated cylindrical bodies of a composite material, to surface dressing and finishing by means of a metal coating.

It is an object of the invention to provide a hard metallic finish on top of a non-metallic composite roll or cylinder. One example of the composite roll comprises carbon fiber composite rolls and shafts.

In this context, prior art technology comprises precision grinding of a composite roll, coating the same, for example in a vacuum, with a gas phase coating, whereafter coating can be continued electrolytically. This type of coating is used for example in the process of chromium plating plastic-bodied water faucets and the like fixtures, another example comprising chromium plated plastic automotive parts. Various metal spraying techniques have also been experimented with varying degrees of success. Although electrically conductive in itself, carbon fiber is not applicable as such to electrolytic deposition, the matrix material covering such carbon fiber being electrically non-conductive.

For example, in the process of manufacturing a precision measured paper machine roll with prior art methods, it is necessary to perform precision grinding prior to coating. The durability and service life of a coating has been a major problem. In uncoated form, however, the durability and smoothness and process engineering properties of carbon fiber and a matrix material have not always been sufficiently good.

This invention endeavors to provide a composite roll, cylinder or casing, which combines the beneficial qualities of a metal casing and, for example, a carbon fiber composite tube. A metal casing can be coated for example with hard chromium, it can be worked for a profiled surface, it can be welded, laser-engraved or engraved with more traditional methods. On the other hand, in terms of its vibration properties and weight, a composite roll is superior to a metal roll. The properties of a composite roll can be regulated by varying angles of the fibers and by varying materials for the matrix and fibers. A preferred composite roll material for a paper machine is an epoxy matrix carbon fiber roll. The inventive solution is capable of providing, for example, a composite roll for a paper machine, which is almost as light as a composite roll but has surface properties consistent with a hard-chromium plated metal roll. Of course, the same inventive solution can be used for coating other cylindrical bodies, as well. Plating a composite body with a metal, which functions as a primer or base for the ultimate coating, can be performed, as described hereinafter, either during the very process of manufacturing the composite body or applied around an already finished and dimensionally set composite roll.

The function of one embodiment will now be described with reference to the figures.

Figure 1:
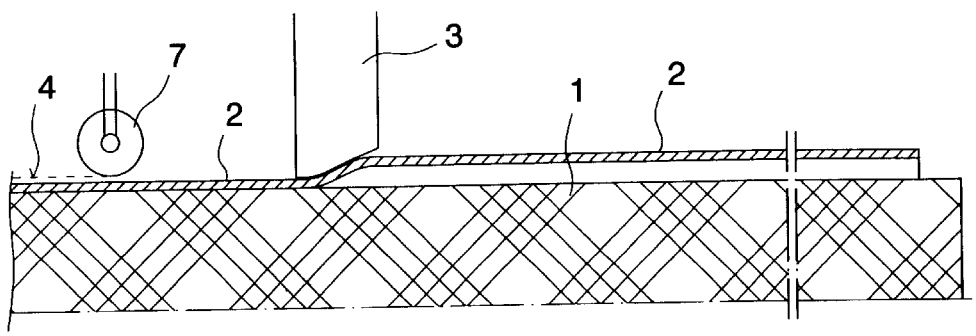
FIG. 1 shows the inventive drawing of a metal coating over a composite roll.
Figure 2:
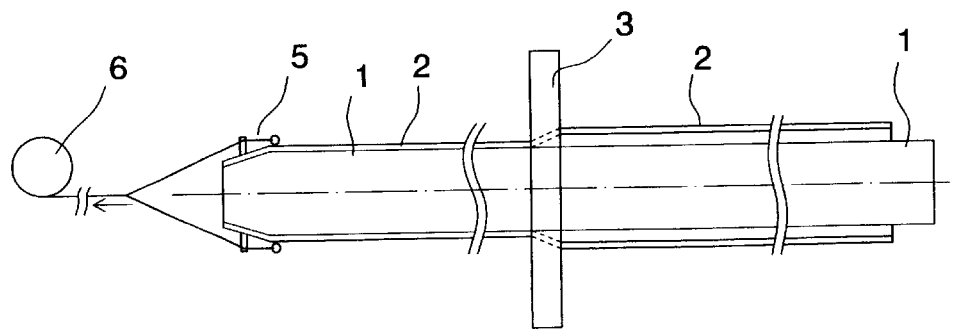
FIG. 2 shows a detail of the drawing mandrel of FIG. 1 and one preferred location for possible further surface treatment equipment.

On top of a composite pipe or roll 1 is drawn a metallic casing 2 through the hole of a drawing die or stone 3. The drawing stone 3 is used for reducing the casing diameter by compression moulding, such that the casing 2 has its internal surface setting tightly against the external surface of the composite pipe or roll 1. The roll, and the casing to be pulled thereover, are drawn by pulling the same with a holding device 5 and, for example, a cable winch 6. Inside the composite pipe or roll can be additionally a mandrel bracing the same, which retains the pipe in its dimensional stability for the duration of a draw. Preferably, the matrix material of a carbon-fiber reinforced roll is still uncured during a draw and is partially cured as a result of heat produced by working. Thus, there is no need for separate sizing, and the bond is also based on adhesion, not just the compression of a coating layer and friction resulting therefrom. Sizing or some other equivalent process, for example heating in the case of a thermoplastic matrix, can also be relevant.

If the drawing of a casing 2 is effected around a continuously uncured composite pipe 1, another advantage gained is that the roll dimensions become accurate at the same time and the surface becomes smooth without separate precision grinding. In this case, it is generally necessary to use an internal mandrel to maintain the dimensional stability of a roll and to press it from inside to its form. If the coating is applied to a roll which is already completely cured or set, the bond can be enhanced by using a suitable adhesive, for example epoxy or a hot-setting thermoplastic, which thus softens during the course of a draw as a result of heat generated by working, or the pipe is heated by other means. Epoxy can set either as a result of heat activation or by means of a catalyst. If the drawing is performed only after the carbon fiber matrix or the like has cured, it is not generally possible to achieve an enhancement of dimensional accuracy by a single process. Thus, when aspiring for a high accuracy or precision, it is necessary to perform grinding prior to coating. A still uncured roll can be drawn in a soft state, whereby the dimensions set by a top-drawn casing remain permanent, and at the same time, the uncured resin, along with heat generated in the drawing process, establishes an effective bond between the top-drawn casing and the actual roll.

The otherwise awkward manufacturing process of a thermoplastic matrix roll can be facilitated in terms of surface properties and dimensional accuracy by a method of the invention, since the drawing of a metal casing results in the provision of a high-quality coating on the plastic surface and, furthermore, precise dimensions can be obtained by drawing the appropriately hot thermoplastic composite roll 1, at the same time with the metal casing 2, to dimensional accuracy.

The metal casing 2 is also capable of providing a a high electrical conductivity for the surface. This is beneficial in terms of eliminating drawbacks caused by static electricity. Static electricity is a problem with carbon fiber rolls, since, although the actual fibers have a comparatively high electrical conductivity, the matrix used between the fibers is usually a highly effective dielectric.

In a paper machine application, the metal surface casing 2 is capable of providing thermal benefits, as well. Since many matrix materials are not highly resistant to a concurrent high temperature and temperature variations and, simultaneously, a high mechanical stress, even a relatively thin metal finish is capable of providing a more durable service life, as temperature variations in the composite roll underneath regarding its surface will be reduced and the mechanical surface pressure will also be lower, nor does the development of brittleness in the matrix material surface underneath cause any problems until the entire roll starts losing its stability and dimensional accuracy.

The actual drawing of a casing over another metal pipe or shaft is prior known technology. The mechanism shown in FIG. 1 can be used for drawing the casing 2 and the roll 1 inside the same through a hole established by the drawing stone 3 and possibly by an internal mandrel. In the case of a stationary internal mandrel, the drawing hole is annular. The internal mandrel can also mobile along with progressing draw, whereby it can be subsequently discarded or retained as a part of the resulting cylinder or roll. During its working process, the metal casing 2 is forced to a sufficiently small diameter to develop a compression between the surface casing 2 and the roll 1. The development of compression is also contributed by an internal mandrel, which can thus simultaneously force the internal roll diameter to expand. The ultimately top-drawn casing immobilizes, for example by bonding with still uncured resin. In addition to pipe drawing, this making of a surface casing can also be effected by means of some other type of initial application, extrusion or, for example, sheet drawing.

In paper machine application, a useful material thickness for the surface casing 2 ranges from the thickness of considerably less than a millimeter up to a relatively heavy shell with a thickness of several millimeters. The choice of a material and the thickness of a coating are largely dependent on the coating or plating to be applied on the metal casing. Regarding the hard chromium surface, a preferred material for the metal casing 2 comprises acid-proof or stainless steel, as well as copper and its alloys. In terms of drawing, aluminum is a convenient material but has a poor applicability to hard-chromium plating, yet, on the other hand, it can be readily topped with oxidation and, for example, with a diamond coating, and aluminum provides also a high-quality base for a teflon coating, for example. A thin layer is inexpensive and sufficient, if, for example, only hard-chromium plating without surface embossing is called for. A thick material is beneficial, if, for example, the rolling of an embossment 4, or perhaps a threading, is called for on the roll surface. Reference numeral 7 represents a device for treating the surface of the metal casing 2. Selection of an appropriate metal and thickness affords nearly all those possibilities of surface treatment which are applicable to an all-metal roll. In addition, the surface metal can be welded for example by laser welding, which results in a gas tight and solid joint for connecting the pipes or joining for example an end piece, or even a terminal for the dissipation of static electricity.

The metal surface can be plated with any electrolytic or chemical coating, such as hard chromium plating or chemical nickel. The metal surface can also be coated by spraying or vapor-deposition technique. A wear-resistance enhancing coating is also established by HVOF or detonation spraying or diamond coating.

Hard chromium plating is a highly preferred way of coating a roll or casing of the invention, particularly in paper machine application. The beneficial surface properties of a hard chromium coating in paper machine rolls are well known in paper machine application. In addition, a hard chromium surface finish is highly durable, especially in comparison with prior known coatings for composite rolls. The thus obtained roll has a weight which is only about 15% of that of a metal roll, it is better than the latter in terms of its vibration properties and, nevertheless, in terms of its surface properties it is compatible with a metallic hard chromium roll. Furthermore, the prior known surface embossing methods do not produce a very durable surface on top of a composite roll, since, during the process of embossing, the reinforcing fibers do not extend intact through the flutes or grooves. Hence, in practice, the ridges or ribs either consist of all matrix, in case the embossing is effected on an uncured surface, or the fibers break at the edges of said ridges, in case the embossing thereof is effected by milling a finished cured composite roll.

The invention is characterized by what is set forth in the independent claims, and the non-independent claims disclose preferred embodiments of the invention.

What is claimed is:

1. A method for coating a composite cylinder, characterized in that on an external surface of said composite cylinder (1) is drawn or extruded a metal casing (2), wherein a metal surface of the casing is modified by a metal treating process and/or plated with a coating layer, the composite cylinder having composite material in an uncured state during the process of drawing or extruding the metal casing (2), and wherein the process of drawing or extruding the metal casing (2) is accompanied by working the cylinder (1) to dimensional accuracy.

2. A method as set forth in claim 1, characterized in that said composite cylinder (1) comprises a carbon fiber composite roll.

3. A method as set forth in claim 1, characterized in that between the composite cylinder (1) and the metal casing (2) to be drawn thereover is delivered a setting additive.

4. A method as set forth in claim 1, characterized in that the metal surface is formed with a surface pattern or embossment to facilitate modifying by a metal treating process and/or plating with a coating layer.

5. A method as set forth in claim 1, characterized in that the metal surface is modified by a metal treating process, wherein the metal treating process comprises rolling the metal surface for a threaded or helical pattern or a pattern of flutes.

6. A method as set forth in claim 1, characterized in that the metal surface plating includes an electrolytic coating.

7. A method as set forth in claim 1, characterized in that the metal surface plating includes a hard chromium plating or a nickel plating.

8. A method as set forth in claim 1, characterized in that the metal casing (2) is treated by welding for joining the casing (2) to another metallic material or for providing a gas tight joint between said casing (2) and another casing.

9. A method as set forth in claim 1, characterized in that plating the metal surface with a coating layer includes a spraying or vapor-deposition process.

10. A method as set forth in claim 9, characterized in that the spraying or vapor-deposition process comprises applying a wear resistant coating by HVOF, detonation spraying or diamond coating.

* * * * *